US005236173A

United States Patent [19]

Wakeman

[11] Patent Number: 5,236,173

[45] Date of Patent: Aug. 17, 1993

[54] ARMATURE BOUNCE DAMPER

[75] Inventor: Russell J. Wakeman, Newport News, Va.

[73] Assignee: Siemens Automotive L.P., Auburn Hills, Mich.

[21] Appl. No.: 850,172

[22] Filed: Mar. 11, 1992

[51] Int. Cl.[5] .......... F16K 31/06

[52] U.S. Cl. .......... 251/129.16; 251/129.15; 251/118; 239/585.4; 239/585.3

[58] Field of Search .......... 251/129.16, 129.15, 251/118; 239/585.4, 585.5, 585.3, 585.1

[56] References Cited

U.S. PATENT DOCUMENTS 3,004,720 10/1961 Knapp et al. .......... 239/585.5
4,529,165 7/1985 Lehrach .......... 251/129.16
4,817,914 4/1989 Pick et al. .......... 251/129.15
4,923,169 5/1990 Grieb et al. .......... 239/585 R
5,114,077 5/1992 Cerny .......... 251/129.16 X
5,123,626 6/1992 Schlagmüller et al. ... 251/129.16 X

FOREIGN PATENT DOCUMENTS 0005872 1/1984 Japan .

*Primary Examiner*—Arnold Rosenthal
*Attorney, Agent, or Firm*—George L. Miller; Russel C. Wells

[57] ABSTRACT

An armature moves in a first and a second direction for causing a needle valve to contact and separate from a valve seat. A stop is situated to provide a motion stop in at least the first direction. Damping is provided for damping the motion of the armature by dissipating energy from a collision of the armature with the stop. The energy dissipation is accomplished by using a spring or washer to hold the needle valve against the valve seat to prevent unwanted fuel seepage to an engine.

6 Claims, 2 Drawing Sheets

ARMATURE BOUNCE DAMPER

FIELD OF THE INVENTION

The present invention relates to a solenoid actuated valve assembly and, more particularly, to means for controlling the bounce of an armature of a solenoid valve.

BACKGROUND OF THE INVENTION

Typically, a solenoid valve comprises an armature movable between a first and second position. The extremes of these first and second positions are often defined by mechanical stops. Armatures can be moved in one direction by an electro-magnetic force generated by a coil of wire and moved in the opposite direction by a return spring. When the armature impacts a stop, it bounces.

In high speed fluid metering solenoids, armature bounce is a problem because each bounce of the armature, or valving element, meters a small uncontrolled amount of fuel into the engine, to the detriment of emissions. As can be appreciated, the leakage of fuel into the engine will result in very unfavorable fuel economy. At either end of its motion, the armature has kinetic energy as a result of its mass and velocity. With no means for dissipating that energy, it is returned to the armature by the elastic collision with the stop. Eventually, the energy is dissipated after a series of collisions and bounces. The bounce of the armature affects the operation of a fuel injector by prolonging or shortening the duration of injection, causing excessive wear in the valve seat area.

It is seen then that there exists a need for a means for damping the motion of an armature to diminish bounce, thereby diminishing the amount of fuel into the engine and the wear in the valve seat area.

SUMMARY OF THE INVENTION

This need is met by the system according to the present invention, wherein added energy dissipation and a lower rate for the elastic portion of the collision is provided to the fluid metering solenoid. Energy dissipation is added by using a wave spring or Belleville washer to hold the valve seat against a reference surface, preventing fuel seepage to the engine.

In accordance with one aspect of the present invention, a device comprises an armature movable in a first and a second direction for causing a needle valve to contact and separate from a valve seat. A stop means provides a motion stop in at least the first direction. The device further comprises damping means for damping the motion of the armature by dissipating energy from a collision of the armature with the stop means. The damping means includes means for holding the needle valve against the valve seat to prevent fuel seepage to the engine, and at least one o-ring for improving energy dissipation as the o-ring coacts with a surface of a swirl guide.

For a full understanding of the nature and objects of the present invention, reference may be had to the following detailed description taken in conjunction with the accompanying drawings and the appended claims.

DESCRIPTION OF THE PREFERRED EMBODIMENT

Figure 1:
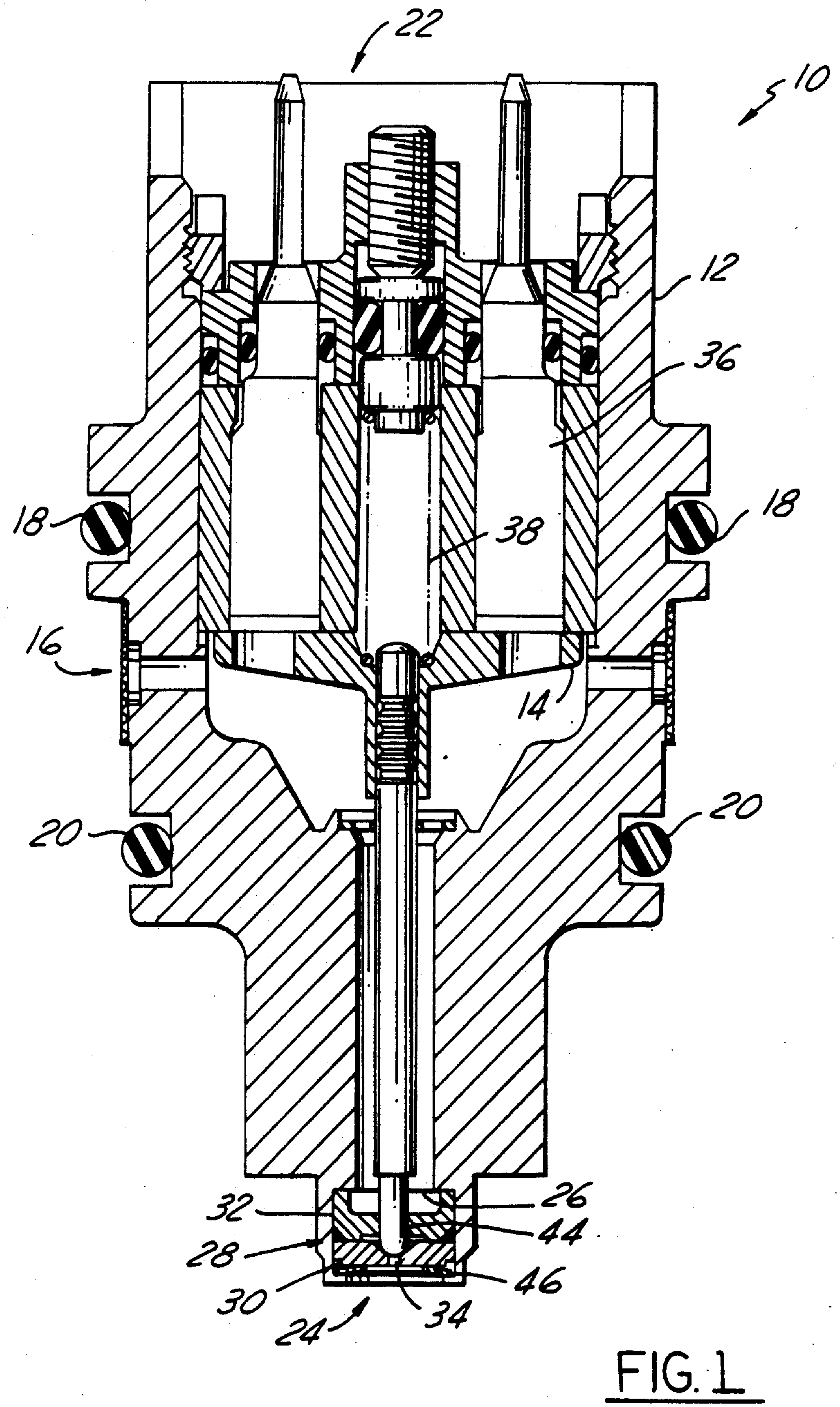
FIG. 1 is a cross section view of a high pressure fuel injector.

Referring to FIG. 1 there is illustrated in cross section, a typical high pressure fuel injector 10 designed to operate at fuel pressures over 1000 psi. The injector 10 includes a tubular housing 12 made from nonmagnetic stainless steel. The inside of the tubular housing 12 contains an armature 14 and a plurality of different diameters to form typical various shoulders for a variety of different functions. Positioned along the outside of the housing 12 and on either side of an inlet 16 are sealing means 18 and 20 to seal the injector 10 in a bore of an engine or manifold where it is located. The housing 12 has an open end 22, and an outlet end 24. The outlet end 24 is counterbored to form a shoulder 26 for locating a seat assembly 28 comprised of a valve seat 30 and a swirl guide 32.

Figure 2:
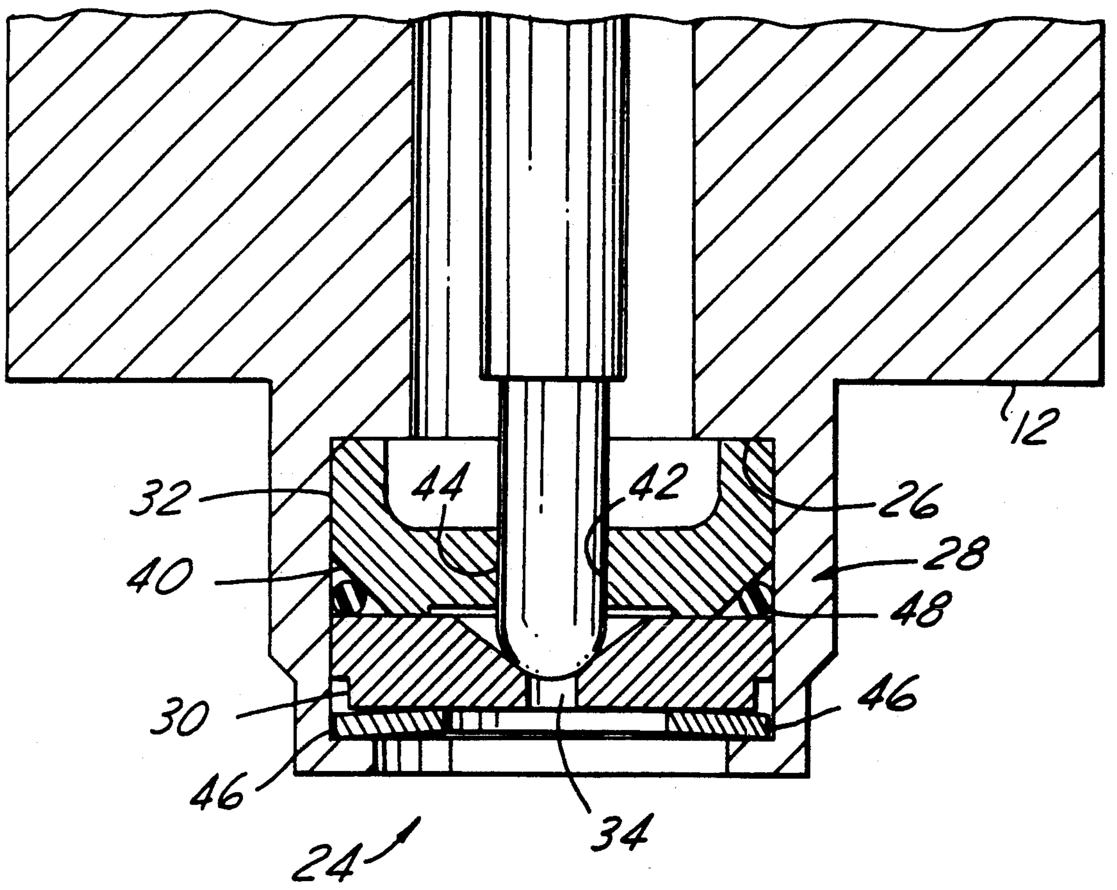
FIG. 2 is an enlarged cross section of an outlet end of the high pressure fuel injector of FIG. 1.

Referring now to FIG. 2, an enlarged view of the outlet end 24 is illustrated. The outlet end 24 encloses the seat assembly 28, including the valve seat 30 which contains an orifice 34. The valve seat 30 can operate as a stop means for the armature 14 located within the housing 12 and movable against the valve seat 30 in response to a magnetic force generated by a coil 36 and a return spring 38. The swirl guide 32 controls the fuel spray to form a swirl pattern so that, as the fuel leaves the orifice 34, it forms a solid conical spray pattern. The swirl guide is positioned between the valve seat 30 and the shoulder 26, and has an angled surface 40 angling away from the housing 12 at a bottom side of the swirl guide 32 toward the valve seat 30. The swirl guide 32 also has an axially aligned bore 42 through which reciprocates a needle valve 44 of the armature 14.

A spherical radius at one end of the needle valve 44 mates with the valve seat 30 to close the injector 10 when the armature 14 moves in a first, or closing, direction. If the needle valve 44 is not biased against the valve seat 30, as when the armature 14 is moving in a second, or opening, direction, fuel is allowed to seep through crevice volumes created between the needle valve 44 and the valve seat 30. Fuel also seeps through crevice volumes between the housing 12 and the swirl guide 32, and between the swirl guide 32 and the valve seat 30. The motion of the valve seat 30, therefore, must be accompanied by the flow of fuel in and out of these crevice volumes while controlling fuel seepage past the valve seat 30 into the engine.

A damping means which includes a damping member 46, such as a wave spring or a Belleville washer, provides damping on the closing side of the injector 10 by holding the needle valve 44 against the valve seat 30. This prevents unwanted fuel seepage to the engine between the spherical radius of the needle valve 44 and the valve seat 30. As the moving seat 30 bounces on the damping member 46, kinetic energy of the armature 14 collision is turned into spring potential energy to dissipate the energy of the armature 14 bounce. This minimizes the negative effects of the armature 14 bounce. Energy dissipation and a lower rate for the elastic part of the collision of the needle valve 44 against the valve seat 30 is provided by using the damping member 46 to bias the valve seat 30 upward against the swirl guide 32.

This, in turn, holds the needle valve 44 against the valve seat 30 to prevent fuel seepage to the engine.

Continuing with FIG. 2, the damping means further includes an o-ring 48 which is in contact with both the moving seat 30 and the stationary housing 12. Due to the energy dissipation provided by the damping member 46, the motion of the o-ring 48 is so small that the o-ring 48 rolls rather than slides, along the swirl guide angled surface 40, providing improved and reliable damping. Manipulating the damper member 46 preload, or the o-ring 48 material and squeeze, can provide tuning of the damper means for varying degrees of damping.

It is to be understood that several sealing means illustrated in the injector 10 are shown as being spaced from the walls surrounding the seals for purposes of clarity only. Obviously, in actual construction and to make the seals operable, this cannot be so, as the seals must be contained so as not to extrude under pressure.

The present invention reduces armature bounce by adding energy dissipation and a lower rate for the elastic part of the collision with the stop. This effectively reduces the amount of fuel into the engine. When the needle valve is held against the valve seat by the preload force of a damping member, the kinetic energy of the armature collision is turned into spring potential energy by moving the assembly mass, including armature mass, back against the damping member. The damping member preload is large enough to maintain accurate seat assembly geometry even with the pressure force applied in the direction of compressing the damping member.

The present invention can provide for energy dissipation by several mechanisms. The area including the swirl guide and the valve seat is surrounded by fluid down as far as the seat o-ring, so motion of the seat must be accompanied by the flow of fluid in and out of the crevice volumes. The very small size of these crevice volume clearances will provide some fluid resistance. Since the swirl guide rests on a flat surface in the housing, there is a squeeze film resisting the motion of the seat either toward or away from the stop, dissipating more energy. The o-ring also provides some damping, since it is in contact with both the moving seat and the stationary housing. Since the motion of the o-ring is so small, due to the energy dissipation provided by the damping member, the o-ring rolls rather than slides along the swirl guide surface, providing reliable damping. As will be understood by those skilled in the art, tuning can be done on all these dampers, manipulating such variables as o-ring material and squeeze, spring washer rates and preloads, diametral clearances, surface geometries, and projected areas.

Having described the invention in detail and by reference to the preferred embodiment thereof, it will be apparent that other modifications and variations are possible without departing from the scope of the invention defined in the appended claims.

What is claimed is:

1. An electrically operated valve assembly comprising:

- a valve body comprising an outlet end at which is disposed a valve seat which comprises a seat surface;

- a needle valve;
- actuating means, comprising an electrical actuator, for moving said needle valve in a first direction and a second direction to cause said needle valve to contact and separate from said seat surface and thereby control flow from said outlet end;
- a needle guide and a Belleville washer disposed at said outlet end, with said valve seat being disposed between said needle guide and said Belleville washer;
- said Belleville washer, said needle guide, and valve seat being arranged such that said Belleville washer biases said valve seat against said needle valve and also dampens impact of said needle valve with said valve seat.

2. An electrically operated valve assembly as set forth in claim 1 further including an o-ring disposed between said needle guide and said valve seat.

3. An electrically operated valve assembly comprising:

- a valve body comprising an outlet end at which is disposed a valve seat which comprises a seat surface;
- a needle valve;
- actuating means, comprising an electrical actuator, for moving said needle valve in a first direction and a second direction to cause said needle valve to contact and separate from said seat surface and thereby control flow from said outlet end;
- a needle guide and a wave spring disposed at said outlet end, with said valve seat being disposed between said needle guide and said wave spring;
- said wave spring, said needle guide, and valve seat being arranged such that said wave spring biases said valve seat against said needle valve and also dampens impact of said needle valve with said valve seat.

4. An electrically operated valve assembly as set forth in claim 3 further including an o-ring disposed between said needle guide and said valve seat.

5. An electrically operated valve assembly comprising:

- a valve body comprising an outlet end at which is disposed a valve seat which comprises a seat surface;
- a needle valve;
- actuating means, comprising an electrical actuator, for moving said needle valve in a first direction and a second direction to cause said needle valve to contact and separate from said seat surface and thereby control flow from said outlet end;
- a needle guide and a spring disk washer disposed at said outlet end, with said valve seat being disposed between said needle guide and said spring disk washer;
- said spring disk washer, said needle guide, and valve seat being arranged such that said spring disk washer biases said valve seat against said needle valve and also dampens impact of said needle valve with said valve seat.

6. An electrically operated valve assembly as set forth in claim 5 further including an o-ring disposed between said needle guide and said valve seat.

* * * * *